United States Patent
Davis et al.

(10) Patent No.: US 6,529,505 B1
(45) Date of Patent: Mar. 4, 2003

(54) SYSTEM FOR EXPANDING A PARAMETER ENCODING FIELD IN A MESSAGE TO ALLOW ADDITIONAL PARAMETERS TO BE ADDED WHILE MAINTAINING COMPATIBILITY WITH EXISTING PARAMETER ENCODINGS

(75) Inventors: William Robert Davis, Woodridge, IL (US); Jason T. Kuo, Naperville, IL (US); Ronald Frank Larson, Naperville, IL (US); Albert Joseph Sawyer, Wheaton, IL (US); Kenneth Wayne Shelhamer, Naperville, IL (US); Larry Phillip Stoa, Warrenville, IL (US); Robin Jeffrey Thompson, Batavia, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/115,149

(22) Filed: Jul. 14, 1998

(51) Int. Cl.$^7$ .................................................. H04J 3/16
(52) U.S. Cl. ....................................... 370/389; 370/465
(58) Field of Search ................................. 370/465, 466, 370/470, 471, 473, 232, 252, 260, 267, 351, 389, 392, 395, 401, 431, 464, 474, 254; 358/434; 375/286; 709/243, 213, 238, 250; 710/242; 380/25; 395/200.12, 650

(56) References Cited

U.S. PATENT DOCUMENTS

| | | | | |
|---|---|---|---|---|
| 5,355,485 A | * | 10/1994 | Denio et al. | 709/213 |
| 5,473,691 A | * | 12/1995 | Menezes et al. | 380/25 |
| 5,621,894 A | * | 4/1997 | Menezes et al. | 395/200.12 |
| 5,708,659 A | * | 1/1998 | Rostoker et al. | 370/392 |
| 5,999,932 A | | 12/1999 | Sunil | |

* cited by examiner

Primary Examiner—Dang Ton
(74) Attorney, Agent, or Firm—Patton Boggs, LLP

(57) ABSTRACT

A system for expanding a parameter encoding field in a new communications protocol that is compatible with an old protocol. An unused command parameter in an old protocol is used to indicate an expanded parameter encoding field in a new protocol. Parameter encodings from the old protocol are unchanged in the new protocol. A system communicating using the old protocol recognizes all parameters from the old protocol and ignores parameters from the new protocol. A system communicating using the new protocol recognizes parameters from both the old and new protocols.

16 Claims, 4 Drawing Sheets

SYSTEM FOR EXPANDING A PARAMETER ENCODING FIELD IN A MESSAGE TO ALLOW ADDITIONAL PARAMETERS TO BE ADDED WHILE MAINTAINING COMPATIBILITY WITH EXISTING PARAMETER ENCODINGS

FIELD OF THE INVENTION

This invention relates to expanding the number of encodings that can be used to represent parameters in a parameter field of messages transmitted between a first and a second communications device. More particularly, this invention relates to an indicator in the parameter field that signals that the message contains an expanded parameter encoding.

1. Problem

It is common for a first device and a second device, such as connected computer systems, to communicate with one another via a communications path. Most communications between devices involve transmitting message packets between the first and second devices. The message packets are streams of binary data that are divided up into different fields representing different pieces of information being transmitted in the message. In order to communicate, the devices must use the same protocol to generate and read the message packets. A protocol is a set of rules that defines the structure of the fields in message packets as well as the encodings of bits in a field.

Packets transmitted between the devices may contain a parameter which may be a command that a receiving device perform a specified function as well as the data required to perform the function or a specific type of data. A parameter is one data field in a message. Each parameter is divided into several sub-fields including a data length sub-field which indicates the length of the parameter in number of bits, a parameter identification field identifying the requested function, and a data field. A unique encoding in the parameter identification field is used to indicate each different parameter supported in a protocol. For example, the parameter identification field may be 8-bits long or one-byte long and each different 8-bit encoding represents a different command. A first parameter could be represented by the encoding 00000000 and a second parameter may be represented by the encoding 00001111. A device receiving a message would read the parameter identification field from a parameter in the message and determine the command to be performed.

It is a problem to add additional commands to a protocol system having a parameter identification field of a predetermined length. The predetermined length of encodings limits the number of encodings that can be used to represent parameters. For example, a one byte or 8-bit encoding field can only hold 256 different encodings. After the 256 different encodings are assigned to different parameters, no more parameters can be added to the protocol.

One method for adding additional parameters to a protocol would be to change the length of the identification field in a parameter to increase the number of available encodings available to represent parameters. However, lengthening of the identification sub-field is unacceptable. If the identification field is lengthened, each device that receives messages using the protocol must receive an updated version of the protocol to recognize the new length of the identification field in a parameter. Otherwise, systems with the older version of the protocol do not recognize the new encodings with the new length and are not able to correctly read a message transmitted in the new protocol. In many systems, expenses and logistics make it impossible to update the protocol used by every device in the system to communicate. A common example of a system that has the above problem is a telephone system. In telephone systems, controllers of switching systems communicate with one another via trunks connecting the switching systems. Message packets are transmitted between the switching systems to establish and maintain connections between calling stations. The message packets include a message type identification, a field indicating the number of bits in the packet and multiple parameters. Each parameter in a packet includes a length field giving the length of the parameter in bits, an identification field of one-byte containing the parameter encoding, and data needed to perform the operation represented by the parameter.

In a telephone system, it is common to reserve specific encodings for parameters representing common operations and data needed to provide telephone service. There remaining encodings can be used to represent other commands that are required to provide custom calling features. However, many telephone companies are expanding the telephone service provided to customers and require more parameter types than there are available encodings. It would be expensive and logistically impossible to install a new protocol in every switching system in a telephone network to add more parameters for the provision of expanded services. Therefore, there is a need to provide a protocol that has more encodings to represent new parameters and is compatible with the existing protocol to allow systems communicating with the older version of the protocol to remain in use.

2. Solution

The above and other problems are solved and an advance in the arts is made by the provision of a system for increasing the number of parameter identifications that can be encoded in a parameter of a message packet while maintaining existing encodings for existing parameters in a protocol. The system of present invention allows a device that communicates using an older version of a protocol to receive messages that contains parameters having expanded encoding fields. The device reads and processes parameters having encodings that represent commands in the older protocol. Parameters having an expanded parameter identification field of the new length are ignored by a device communicating with the older protocol. A device communicating using the new protocol reads and processes parameters having identification field that is either the length expected by the new or old protocol. This invention allows devices that operate using the new protocol to communicate with devices using the old protocol.

In a new protocol, the identification field of a parameter is one of two lengths. The first length of the identification field is the length of encodings in the old protocol. Encodings for parameters supported by the old protocol are written into the identification field of a parameter. If the parameter is a new parameter that is supported by the new protocol, the encoding is the second, expanded length. An encoding that does not represent a parameter in the old protocol is written into the identification field of a new parameter. The unused encoding indicates that an expanded encoding is written in an identification sub-field at the beginning of the data sub-field.

The new protocol is completely backwards compatible with the old protocol. The two protocols are compatible because none of the encodings for commands in the old protocol is changed in the new protocol. A device communicating using the old protocol can read a message packet transmitted by a device using the new protocol and is able to recognize all of the encodings for parameters from the old protocol. When a device communicating with the old protocol reads the unused encoding indicating an expanded encoding, the unused encoding is not recognized as a valid parameter identification in the old protocol and the device does not read the rest of the parameter. The use of the unused encoding ensures that a device communicating in the old protocol does not read the expanded identification field in the data field of a parameter. There is no chance of a device using the old protocol will misinterpret a new parameter encoding as an old parameter and data.

New parameter encodings are recognized by a device using the new protocol in the following manner. The device reads the unused encoding from the identification field of a parameter. The unused encoding signals that is an expanded encoding has been written into the data field. The device then reads the first n-bits of a data field which contain the new encoding for the new parameter. The addition of the new encodings only increases packet length by n bits per parameter containing a new command.

DESCRIPTION OF THE DRAWINGS

The above and other features of this invention can be understood by reading the detailed description below in conjunction with these drawings.

DETAILED DESCRIPTION

Figure 1:
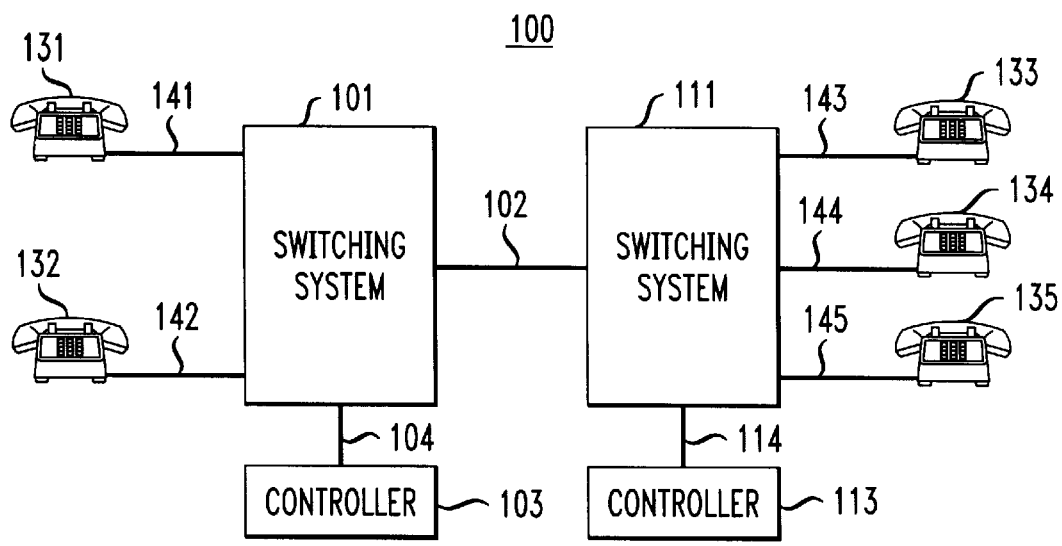
FIG. 1 illustrates a first and a second exemplary device communicating using a message packet protocol.

This invention relates to a protocol used to encode parameters in message packets transmitted between devices. One example of a system that can use the protocol of the present invention is illustrated in FIG. 1. A portion of telephone system 100 is illustrated in FIG. 1. Telephone system 100 has a first switching system 101 and a second switching system 111. Switching system 101 provides telephone service to n calling stations 131–132 via lines 141–142 and switching system 111 provides telephone service to telephone stations 133–135 via lines 143–145. Switching systems 101 and 111 may be switching systems that are well known in the art such as 5-ESS switching system produced by Lucent Technologies. Trunk 102 connects switching systems 101 and 111 to complete call circuits between the systems. Switching systems 101 and 111 can also transmit message packets between one another via trunk 102.

Figure 2:
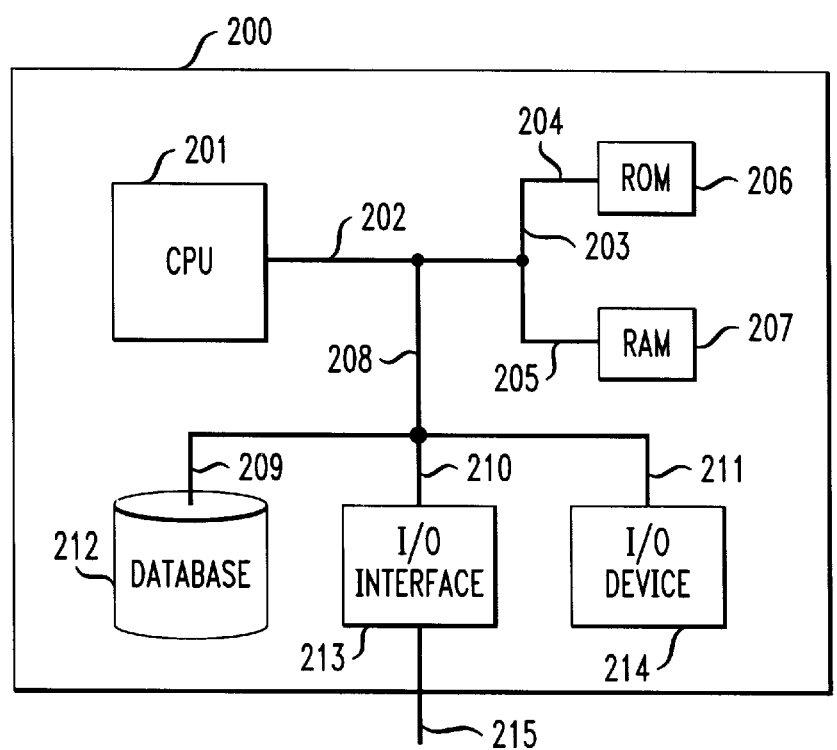
FIG. 2 illustrates a common processing unit of the exemplary devices.

Switching system 101 has a controller 103. Controller 103 is a processing system, as illustrated in FIG. 2, which controls the operations performed by switching system 101. Controller 103 transmits control signals over path 104 to switching system 101. Switching system 111 has a controller 113. Controller 113 is a processing system, as illustrated in FIG. 2, which controls the operations performed by switching system 111. Controller 113 transmits control signals over path 114 to switching system 111. Controller 103 and 113 communicate by transmitting message packets over trunk 102 to coordinate operations of switching systems 101 and 111 to provide telephone service.

FIG. 2 illustrates a typical processing unit 200 that executes applications stored in a memory to perform the functions of controllers 103 and 113. Central Processing Unit (CPU) 201 is a processing unit which reads instructions from memory and executes the instructions. CPU 201 reads and writes data to memory via bus 202 and memory bus 203. Read Only Memory (ROM) 206 is connected memory bus 203 via path 204. ROM 206 stores instructions needed by CPU 201 to execute the basic processing instructions needed to operate processing system 200. Random Access Memory (RAM) 207 is connected to memory bus 203 via path 205. RAM 207 stores data and instructions needed to perform an application.

I/O bus 208 is connected to bus 202 to allow CPU 201 to transfer data to I/O devices connected to the bus. Disk drive 212 is an example of an I/O device that is connected to I/O bus 208. Disk 212 is connected to I/O bus 208 via path 209 and is to store data on a storage media for purposes of communicating with other processing systems to transfer data, processing system 200 has a network interface 213 such as an Ethernet card or a modem. Network interface 213 receives and transmits data from the network via path 215 and is connected to I/O bus 208 via path 210. Other I/O devices 214 may be connected to I/O bus via path 211.

Figure 3:
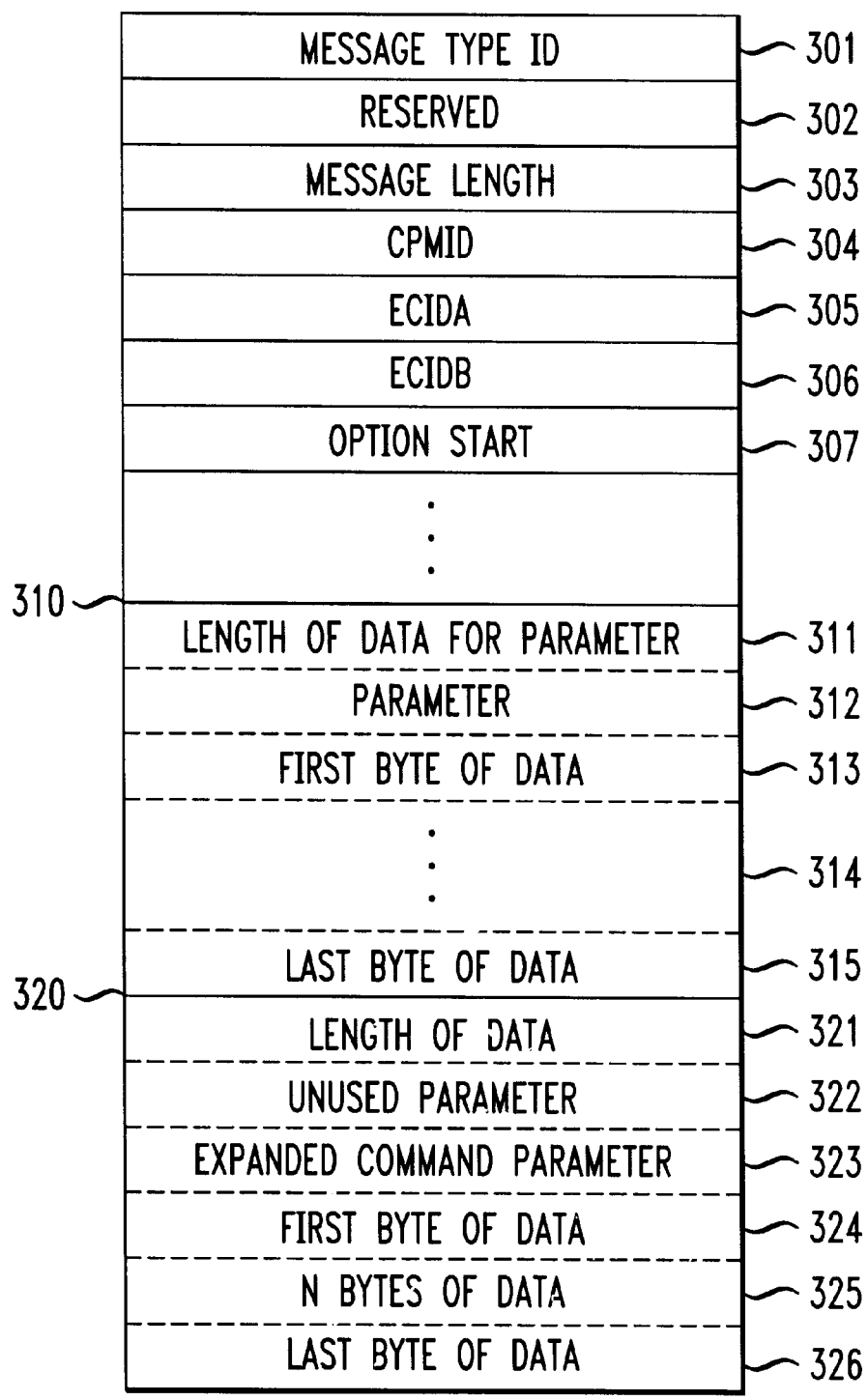
FIG. 3 illustrates a message packet generated using the message packet protocol of this invention.

The present invention is a system for providing a new protocol having expanded parameter encodings that are backwards compatible with older protocols. FIG. 3 illustrates a message packet 300 used to transmit data between switching systems using a call protocol similar to the SS7 call protocol for providing telephone service. It is understood that the system for expanding parameters of the present invention can be used in message packets of other protocols and in other systems to expand parameter encoding fields.

Message packet 300 includes standard overhead data well known in the art including message identification field 301, data field 302, message length field 303, Cellular Processing Module ID (CPMID) field 304, Executive Cellular Processor Call ID A (ECID A) field 305, and Executive Cellular Processor Call ID B (ECID B) field 306. Field 307 is the start of the parameter fields encoded in packet 300. For exemplary purposes, message 300 contains a parameter 310 having a parameter encoding for a parameter from the older protocol and a parameter 320 having a new parameter encoding from the new protocol. A typical packet 300 has at least one parameter and may contain a multiple parameters in one packet. The number of parameters in a message is left to a designer of the protocol.

Parameter 310 exists in the old protocol and has a parameter encoding that is recognized by systems that communicate using either the old or the new protocol. The first data field 311 indicates the length in bytes of parameter 310. A system will group this amount of bytes with this parameter when the packet is read. Parameter identification field 312 is a byte of data containing an encoding that is unique for the encoded command in the older protocol. Fields 313–315 are fields of n bytes of data that are transmitted in the parameter for use in performing the operation represented by the parameter. A switching system operating using either the old or new protocol will recognize parameter 310 and will process parameter 310.

Parameter 320 is from the new protocol and has an expanded parameter identification field. Parameter 320 is not supported by the old protocol and a system using the old protocol will not recognize the parameter encoding. A system communicating using the old protocol will skip new parameter 320 because the encoding is not recognized. In parameter 320, length field 321 indicates the length of parameter 320 in bytes. In the preferred embodiment, one byte representing the new parameter encoding is added to the data length. It should be recognized by one skilled in the art that any number of bytes can be added to be used for parameter encodings.

In command encoding field 322, an unused parameter encoding from the old protocol is written. The unused encoding indicates to a system operating communicating with the new protocol that a new encoding is contained in parameter 320. The unused encoding is not recognized by a system communicating using the old protocol and the system skips parameter 320. In the preferred embodiment, second parameter identification field 323 is contained in the first byte of data. It should be recognized by one skilled in the art that the location of the second parameter encoding field may be placed at any location in the data field and any number of subsequent parameter encoding fields can be added to the data of parameter 320 to increase the number of parameters that can be represented. Fields 324–326 contain the n bytes of data needed to execute parameter 320.

Figure 4:
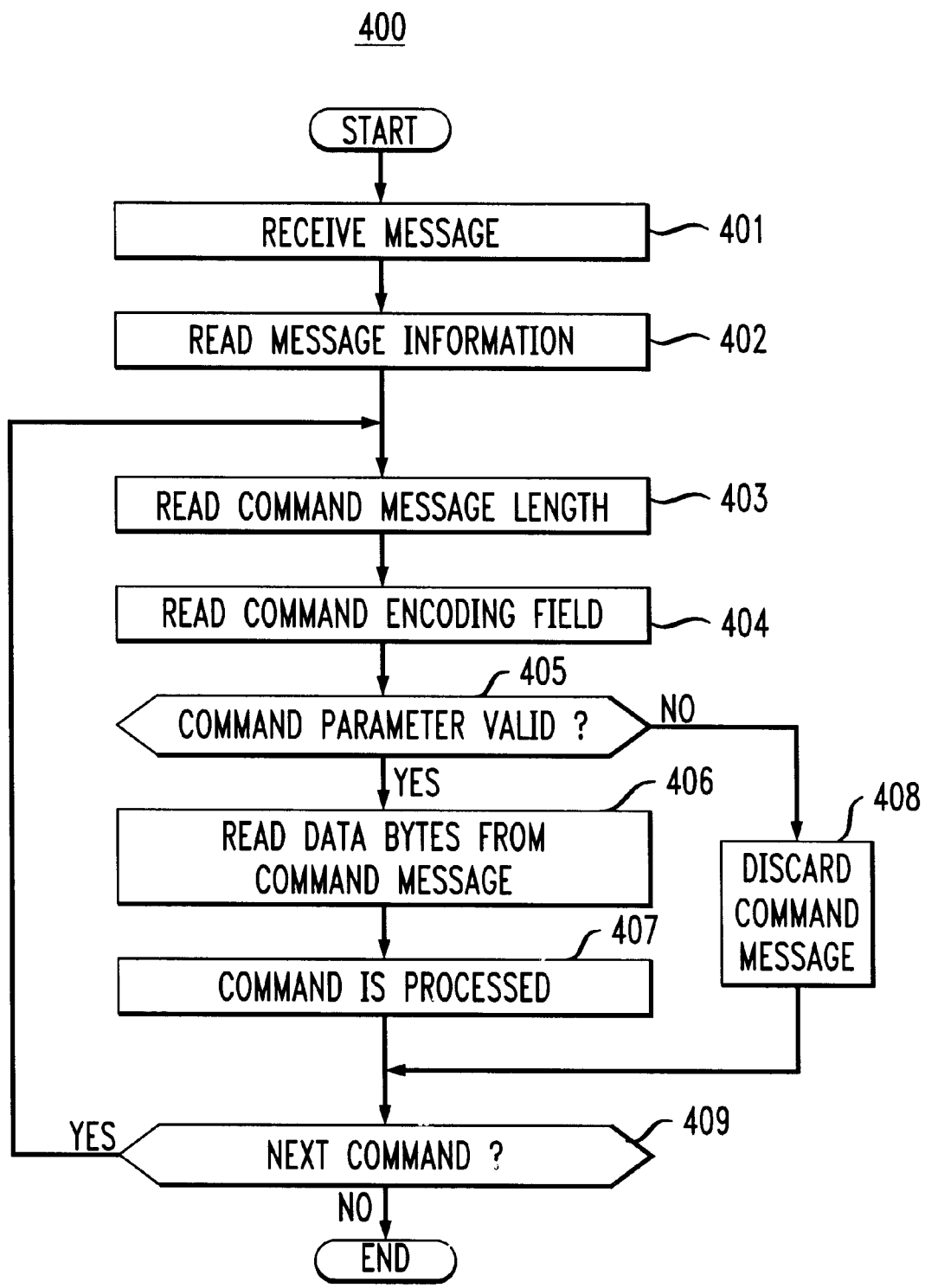
FIG. 4 is a flow diagram of a process executed when a new command parameter is read by a device using an old protocol.
Figure 5:
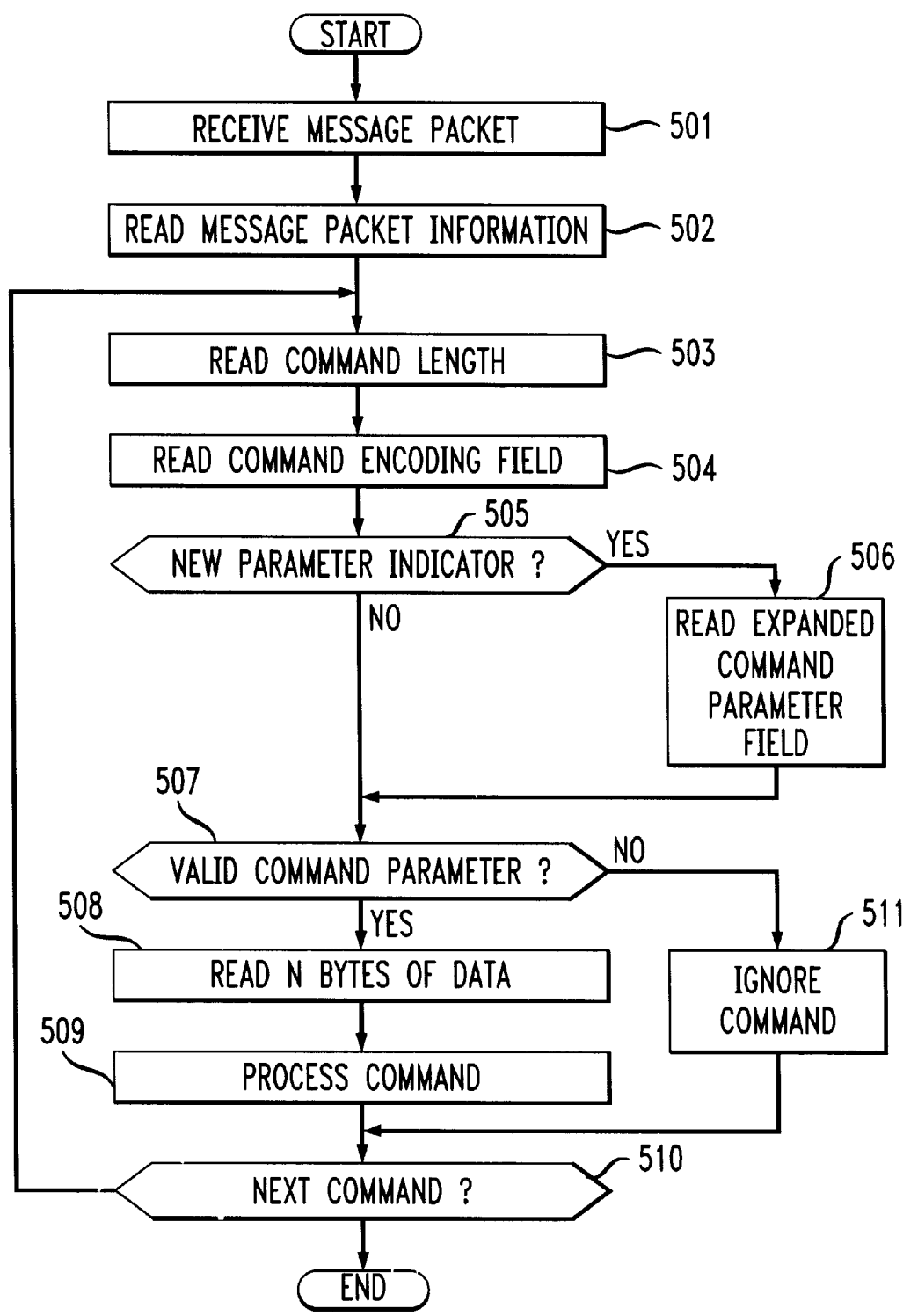
FIG. 5 is a flow diagram of a process executed when a new command is read by a device using the new protocol.

The advantage of the encoding scheme in the new protocol used to generate message packet 300 is that the message packets from the new protocol are readable by systems operating using the older protocol. This allows the new protocol to be implemented without having to incorporate the new protocol in every system in a network. Systems using the old protocol simply ignore new parameter encodings as unidentified parameters. FIGS. 4 and 5 describe processes for reading messages that are executed by systems communicating in the old protocol and systems communicating in the new protocol.

FIG. 4 illustrates process 400 which is an overview of the steps executed by system that communicates using the old protocol to read packets received from a system communicating in the new protocol. Process 400 begins in step 401 with the system using the old protocol receiving packet 300. In step 402, the system reads message packet information from fields 301–306 of packet 300. In step 403, parameter length is read and a counter is set. In step 404, the parameter identification field command encoding field of the parameter is read.

It is then determined whether the parameter encoding is recognized in step 405. If the parameter encoding is recognized, the number bytes of data identified in a data length field 311 are read in step 406 and the system proceeds by processing the parameter in step 407. If the parameter encoding is not recognized, the parameter length in bytes from the data length field 311 or 321 is read and discarded in step 408. After step 407 or 408, it is determined if there are more parameters in message packet 300 in step 409. If there are more parameters, steps 403–409 are repeated. Otherwise, process 400 ends.

FIG. 5 illustrates process 500 which is an overview of the operation of receiving and reading a message packet performed by a system using the new protocol. Process 500 begins in step 501 with the system using the new protocol receiving packet 300. In step 502, the system reads message packet information from fields 301–306 of packet 300. In step 503, command message length for a command is read and a counter is started which determines the amount of bytes read. In step 504, the parameter identification field 312 or 322 of the parameter is read.

It is then determined whether the read encoding is an encoding indicating a new parameter in step 505. A new encoding is indicated by a predetermined unused command encoding from the old protocol. If the encoding indicates a new parameter, the second identification field containing the new encoding is read from the expanded command encoding field in step 506. In step 507, it is determined whether the read new encoding is valid identification of a parameter.

If the new encoding is valid, the number of n data bytes indicated in the data length field 311 or 321 are read in step 508. The parameter is then processed in step 509. In step 510, it is determined if message packet 300 contains another parameter. If message packet 300 does not contain another parameter, process 500 ends. If message packet 300 contains another parameter, process 500 is repeated starting from step 503. If it is determined that the new parameter encoding is not a valid parameter identification in step 507, the next n bytes of data are read and ignored in step 511. The system then proceeds to step 510.

If it is determined that parameter encoding field 312 or 322 contains an encoding from the older protocol, it is determined whether the encoding is a valid parameter identification in step 507. If the encoding is not valid, the number of data bytes in data length field 311 or 321 is read and ignored in step 511. Process 500 proceeds to step 510 after step 511. If the command is valid, steps 508 through 510 are executed.

The above description is one exemplary of a command parameter of a new protocol that is compatible with command parameters of an old protocol. It is expected one skilled in the art can and will design alternative compatible command parameters that infringe on the invention as set forth in the claims below either literally or through the Doctrine of Equivalents.

What is claimed is:

1. A communication system for transmitting message packets between processing systems comprising:
   means in a first processing system for generating and transmitting messages in a first protocol;
   a parameter in said message containing a parameter identification field;
   an indicator encoding in said parameter identification field indicating an expanded parameter identification;
   an expanded parameter identification sub-field in a data field of said parameter;
   means in a second processing system for receiving said message;
   means in said second processing system for reading said parameter responsive to receiving said message;
   means responsive to reading said parameter for determining whether said indicator encoding is in said parameter identification field;
   means responsive to a determination that said indicator encoding is contained in said parameter identification field of said parameter for reading said expanded parameter identification field from said parameter containing a one of a plurality of encodings representing a parameter that is supported by said first protocol and is not supported by a second protocol; and
   means for processing said parameter responsive to reading said expanded encoding.

2. The system of claim 1 wherein said expanded parameter sub-field is in a data segment of said parameter in said message.

3. The system of claim 2 wherein said expanded parameter identification sub-field is at a beginning of said data segment.

4. The system of claim 1 wherein said indicator encoding is an unused parameter encoding for parameters supported by said second protocol.

5. The system of claim 1 further comprising:
means in said second device for determining whether said encoding in said parameter identification field represents a parameter supported by said second protocol responsive to a determination that said indicator encoding is not contained in said parameter identification field;
means responsive to a determination that said encoding represents a parameter supported by said second protocol for processing said parameter.

6. The system of claim 1 further comprising:
means in a third processing system for receiving message from said first processing system;
means for said reading said parameter from said message;
means for reading said parameter encoding from said parameter identification field of said parameter;
means for determining whether said parameter encoding represents a parameter supported by said second protocol; and
means for processing said parameter responsive to a determination that said parameter encoding represents a parameter supported by said second protocol.

7. The system of claim 6 further comprising:
means responsive to a determination that said encoding does not represent a parameter supported by said second protocol for ignoring said parameter.

8. A system for transmitting message packets between a first communications device and a second communications device comprising:
an old protocol defining the data structure of said packets;
a parameter identification field in a parameter contained in a packet;
a first plurality of parameter encodings for identifying a first plurality of parameters supported by said old protocol in a parameter identification field;
a new protocol for defining data structures of said packets which supports said first plurality of parameters supported by said first protocol and said first plurality of encodings;
an indicator encoding in said first plurality of parameter encodings that is written into said parameter identification field to indicate an expanded parameter identification field of said parameter in said second protocol;
a second plurality of parameters that are supported by said second protocol and are represented by a second plurality of parameter encoding written into said expanded identification field.

9. The system of claim 8 wherein each of said message packets contains at least one parameter and each parameter comprises:
a data field in each parameter in a packet; and
said expanded parameter identification field being in said data field of said parameter.

10. The system of claim 9 wherein said expanded parameter identification field is at the beginning of said data field.

11. The system of claim 9 wherein a first communications device executes instructions for said old protocol stored on a machine readable media to perform the steps of:
reading an encoding from an identification field of a parameter;
determining whether said encoding is a one of said plurality first plurality of encodings corresponding to one of said first plurality of parameters; and
ignoring said parameter responsive to a determination said encoding does not correspond to one of said plurality of parameters.

12. The method of claim 9 wherein a first communications device executes instructions for communicating with said new protocol stored on a machine readable media to perform the steps of:
reading a first encoding from a parameter identification field of a parameter;
determining whether said first encoding is said indicator encoding;
reading an expanded encoding from said expanded identification field in said parameter responsive to a determination that said first encoding is said indicator encoding;
determining whether said expanded encoding represents to a one of said second plurality of parameters; and
processing said parameter responsive to a determination that said expanded encoding represents one of said second plurality of parameters.

13. A method for detecting an expanded command encoding field in a parameter in a message received by a first device from a second device via a communication path comprising the steps:
receiving a message;
reading a parameter encoding from a parameter identification field from a parameter in said message;
determining whether said parameter encoding is an indicator of an expanded parameter identification in said parameter;
reading an expanded identification encoding from an expanded parameter identification field responsive to said encoding being said indicator;
determining said expanded parameter encoding represents a parameter supported by a first protocol; and
processing said parameter responsive to a determining said expanded command encoding represents a command supported by said first protocol.

14. The method of claim 13 wherein said indicator is an unused parameter encoding in an old protocol and said method further comprises the step of:
determining said parameter encoding read from said parameter encoding field represents a parameter supported in a second protocol responsive to a determination that said parameter encoding is not said indicator;
processing said parameter responsive to a determination said parameter represents a parameter supported by said second protocol.

15. The method of claim 13 wherein said first device communicates using said second protocol that does not support expanded parameter encodings and said method further comprises the step of:
ignoring said parameter responsive to a determination that said parameter encoding is said indicator.

16. The method of claim 13 wherein said first and said second devices are switching systems and said method further comprises the steps of:
reading call data from said message.

* * * * *